(12) United States Patent
Nishiwaki (10) Patent No.: US 11,491,862 B2
(45) Date of Patent: Nov. 8, 2022

(54) VEHICLE

(71) Applicant: YAMAHA HATSUDOKI KABUSHIKI KAISHA, Iwata (JP)

(72) Inventor: Ryoji Nishiwaki, Shizuoka (JP)

(73) Assignee: YAMAHA HATSUDOKI KABUSHIKI KAISHA, Shizuoka (JP)

(*) Notice: Subject to any disclaimer, the term of this patent is extended or adjusted under 35 U.S.C. 154(b) by 22 days.

(21) Appl. No.: 17/367,718

(22) Filed: Jul. 6, 2021

(65) Prior Publication Data

US 2022/0009340 A1 Jan. 13, 2022

(30) Foreign Application Priority Data

Jul. 7, 2020 (JP) .............................. JP2020-117164

(51) Int. Cl.
*B60K 11/04* (2006.01)
*B62D 23/00* (2006.01)

(52) U.S. Cl.
CPC ............ *B60K 11/04* (2013.01); *B62D 23/005* (2013.01); *B60Y 2200/20* (2013.01)

(58) Field of Classification Search
CPC ...... B60K 11/04; B60K 11/08; B62D 23/005; B60Y 2200/20; B60Y 2200/124
See application file for complete search history.

(56) References Cited

U.S. PATENT DOCUMENTS

| | | | |
|---|---|---|---|
| 4,267,895 A * | 5/1981 | Eggert, Jr. | ............... B60K 1/04 903/952 |
| 4,667,758 A | 5/1987 | Tamura | |
| 5,199,521 A * | 4/1993 | Samejima | ................ F01P 11/12 56/6 |
| 2010/0019539 A1* | 1/2010 | Nakamura | ......... B62D 33/0625 296/190.04 |
| 2019/0061450 A1 | 2/2019 | Hayashi et al. | |

(Continued)

FOREIGN PATENT DOCUMENTS

| | | | |
|---|---|---|---|
| AU | 2008202766 A1 * | 3/2009 | ............... B60N 2/22 |
| CN | 102673699 A * | 9/2012 | ............. B60K 11/04 |
| CN | 105492699 A * | 4/2016 | ............. B60K 11/04 |

(Continued)

OTHER PUBLICATIONS

Nishiwaki, "Vehicle", U.S. Appl. No. 17/367,721, filed Jul. 6, 2021.

*Primary Examiner* — Hung Q Nguyen
(74) *Attorney, Agent, or Firm* — Keating and Bennett, LLP (57) ABSTRACT

A vehicle includes first and second seats supported by a frame, a cargo bed located more rearward than first and second seating portions of the first and the second seats, and a radiator located more rearward than the first and second seating portions and lower than a lower surface of the cargo bed. The radiator is located farther outward, in a width direction of the vehicle, than an engine that is located more rearward than a front end of the first and the second seats and at or substantially at a center of the vehicle in the vehicle width direction. The radiator includes an outer surface facing rearward and outward of the vehicle. A rotating fan to introduce air from outside the vehicle to inside the vehicle via the outer surface of the radiator is located on either one of an outer surface side and an inner surface side of the radiator.

11 Claims, 6 Drawing Sheets

(56) References Cited

U.S. PATENT DOCUMENTS

2019/0193553 A1    6/2019   Uno et al.

FOREIGN PATENT DOCUMENTS

| | | | |
|---|---|---|---|
| FR | 2912349 A1 * | 8/2008 | ............. B60K 11/04 |
| JP | 02-042497 Y2 | 11/1990 | |
| JP | 04-18948 Y2 | 4/1992 | |
| JP | 2689608 B2 | 12/1997 | |
| JP | 2003-276455 A | 9/2003 | |
| JP | 2009-067072 A | 4/2009 | |
| JP | 4378358 B2 * | 12/2009 | ......... B60H 1/00378 |
| JP | 2010-030364 A | 2/2010 | |
| JP | 2010-095105 A | 4/2010 | |
| JP | 1981762 B2 | 7/2012 | |
| JP | 2016-182879 A | 10/2016 | |
| JP | 2019-038303 A | 3/2019 | |
| JP | 2019-043274 A | 3/2019 | |
| JP | 2019-116198 A | 7/2019 | |
| WO | WO-9912797 A1 * | 3/1999 | ............. B60K 11/04 |
| WO | WO-2010044174 A1 * | 4/2010 | ............. B60K 17/34 |
| WO | WO-2014049640 A1 * | 4/2014 | ............... B60K 1/00 |

\* cited by examiner

VEHICLE

CROSS REFERENCE TO RELATED APPLICATIONS

This application claims the benefit of priority to Japanese Patent Application No. 2020-117164 filed on Jul. 7, 2020. The entire contents of this application are hereby incorporated herein by reference.

BACKGROUND OF THE INVENTION

1. Field of the Invention

The present invention relates to vehicles, and more specifically to ROVs (Recreational Off-Highway Vehicles) and the like.

2. Description of the Related Art

Generally, a vehicle has its radiator disposed at e.g., a front portion of the vehicle for efficient heat exchange at the radiator through utilization of an air flow which comes in from ahead while the vehicle is traveling. Also, when layout requirements do not allow the radiator to be disposed at a forward position of the vehicle, the radiator may be disposed at a rearward position of the vehicle, but even in this case, the radiator is disposed with its outer surface faced ahead of the vehicle so as to utilize the air flow which comes in from ahead of the vehicle. In this arrangement, the vehicle is equipped with an air intake such as a duct, to enhance the air flow onto the radiator.

Japanese Patent No. 4981762 discloses an example which is pertinent to conventional techniques of this kind. Japanese Patent No. 4981762 discloses a work vehicle, which is a so called midship vehicle, having its radiator on a side of its engine, below rear seats, in a slanted attitude so that the radiator has its air intake surface facing diagonally forward and outward. Also, in order to successfully introduce outside air from ahead of the vehicle toward the radiator as the vehicle travels, a large number of air openings are formed in a deck member which is located ahead of the radiator. Further, there is provided a radiator cover which covers the radiator and has air inlets. The radiator cover is provided in order to prevent foreign objects, dust and other materials from contacting or attaching onto the air intake surface of the radiator, and to guide the outside air which was introduced from the air openings of the deck member toward the air intake surface of the radiator.

As described, in the work vehicle according to Japanese Patent No. 4981762, the radiator is positioned so that its air intake surface faces forward and outward of the vehicle, at a rear of the vehicle. Also, the vehicle requires the deck member to be formed with a large number of air openings, and the radiator cover which covers the radiator and has the air inlets in order to successfully guide the outside air to the radiator and decrease chances of clogging of the radiator with dirt, dust and others kicked by the front wheels.

SUMMARY OF THE INVENTION

According to an aspect of a preferred embodiment of the present invention, a vehicle includes a front wheel; a rear wheel; a frame supported by the front wheel and the rear wheel; a first seat for a driver, supported by the frame and including a first seating portion; a second seat supported by the frame, provided next to the first seat and including a second seating portion; a cargo bed provided at a position more rearward than the first seating portion and the second seating portion; a radiator including an outer surface facing rearward and outward of the vehicle, and located more rearward than the first seating portion and the second seating portion and lower than a lower surface of the cargo bed; and a rotating fan to introduce air from outside the vehicle to inside the vehicle via the outer surface of the radiator.

According to a preferred embodiment of the present invention, the radiator is located more rearward than the first seating portion and the second seating portion and lower than the lower surface of the cargo bed, and further includes the outer surface facing rearward and outward of the vehicle. Therefore, it is possible, without providing a radiator cover, to prevent flying objects coming from ahead of the vehicle from directly hitting the outer surface of the radiator, and decrease damage caused to the radiator by the flying objects coming from ahead of the vehicle. Also, by operating the rotating fan, it is possible to forcibly introduce outside air from the outward of the vehicle, through the radiator and in an inward direction of the vehicle. Therefore, it is possible to bring outside air to the radiator without providing members for introduction of outside air from ahead of the vehicle. Therefore, it is possible to prevent flying objects from coming ahead of the vehicle to the outer surface of the radiator, and to maintain cooling efficiency of the radiator, effectively.

Preferred embodiments of the present invention are particularly effective in off-road vehicles such as ROVs designed primarily for traveling on rough terrain.

Preferably, the vehicle further includes an engine located more rearward than a front end of the first seat and the second seat and at or substantially at a center of the vehicle in the vehicle width direction. In this arrangement, the radiator is provided at a position more outward, in the vehicle's width direction, than the engine. In this case, it is possible, with the rotating fan, to introduce outside air which has passed through the radiator inwardly of the vehicle, and to introduce the outside air also to a rearward portion of the first seat and the second seat. Therefore, it is possible to improve an ability to cool the engine and surrounds thereof.

Preferred embodiments of the present invention are particularly effective in midship vehicles.

Further preferably, the vehicle further includes a transmission jointed to the engine. In this arrangement, the radiator overlaps the engine or the transmission in a side view. In this case, it is possible to locate the radiator closely to the engine and/or the transmission, supply effectively the outside air which was introduced by the rotating fan to surroundings of the engine and the transmission, and therefore to increase air fluidity and the temperature rise of the engine and the transmission can be reduced or prevented. Also, it becomes possible to shorten a pipe between the radiator and the engine, making it possible to reduce cost.

Further, preferably, the frame includes an intermediate portion, a rear portion narrower than the intermediate portion and provided at a position behind the intermediate portion; and a connecting portion connecting the intermediate portion and the rear portion with each other; the connecting portion includes a slanted portion extending rearward and diagonally inward, toward the rear portion, and the radiator is supported by the slanted portion. In this case, the slanted portion extends rearward and diagonally inward, toward the rear portion. By placing the radiator along or substantially along the direction in which the slanted portion extends, and supporting with the slanted portion, it becomes possible to dispose the radiator easily, without allowing it to protrude outward beyond the slanted portion while the outer surface of the radiator faces rearward and outward of the vehicle.

Preferably, the radiator is provided at a position more forward than the rear wheel, and the vehicle further includes a shield provided between the radiator and the rear wheel. In this case, it is possible, with the shield which defines and functions as a mudguard, to decrease damage caused to the radiator by flying objects from the rear wheel.

Further preferably, an outer end of the radiator is located more inward in the vehicle width direction than an outer end of the shield. In this case, it is possible to further decrease damage caused to the radiator by flying objects from the rear wheel.

Further, preferably, the rotating fan is provided on either one of the outer surface side and an inner surface side of the radiator. In the case where the rotating fan is disposed on the inner surface side of the radiator, it is possible, with the radiator, to protect the rotating fan from flying objects from outward. On the other side, in the case where the rotating fan is disposed on the outer surface side of the radiator, it is possible, with the radiator, to protect the rotating fan from heat of the engine for example.

Preferably, the radiator is placed on each of a left and a right sides of the frame. In this case, by providing a plurality of radiators, it becomes possible to improve cooling ability, and also to decrease the size of each radiator.

Further preferably, the vehicle further includes an air intake which introduces air to the radiator. In this case, it is possible to improve an rectification effect to the radiator.

In descriptions of preferred embodiments of the present invention, the term "outward of the vehicle" means any direction extending radially from the vehicle in a vertical plane orthogonal to the vehicle's fore-aft direction, and includes not only lateral sides of the vehicle but also upper and lower sides, for example, of the vehicle.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the drawings. It should be noted here that the terms front and rear, left and right, and up and down used in the preferred embodiments of the present invention refer to front and rear, left and right, and up and down based on the state where a driver of the vehicle 10 is seated in a first seat 18a, facing a steering wheel 20. In the drawings, "Fr" indicates forward, "Rr" indicates rearward, "R" indicates rightward, "L" indicates leftward, "U" indicates upward and "Lo" indicates downward.

Figure 1:
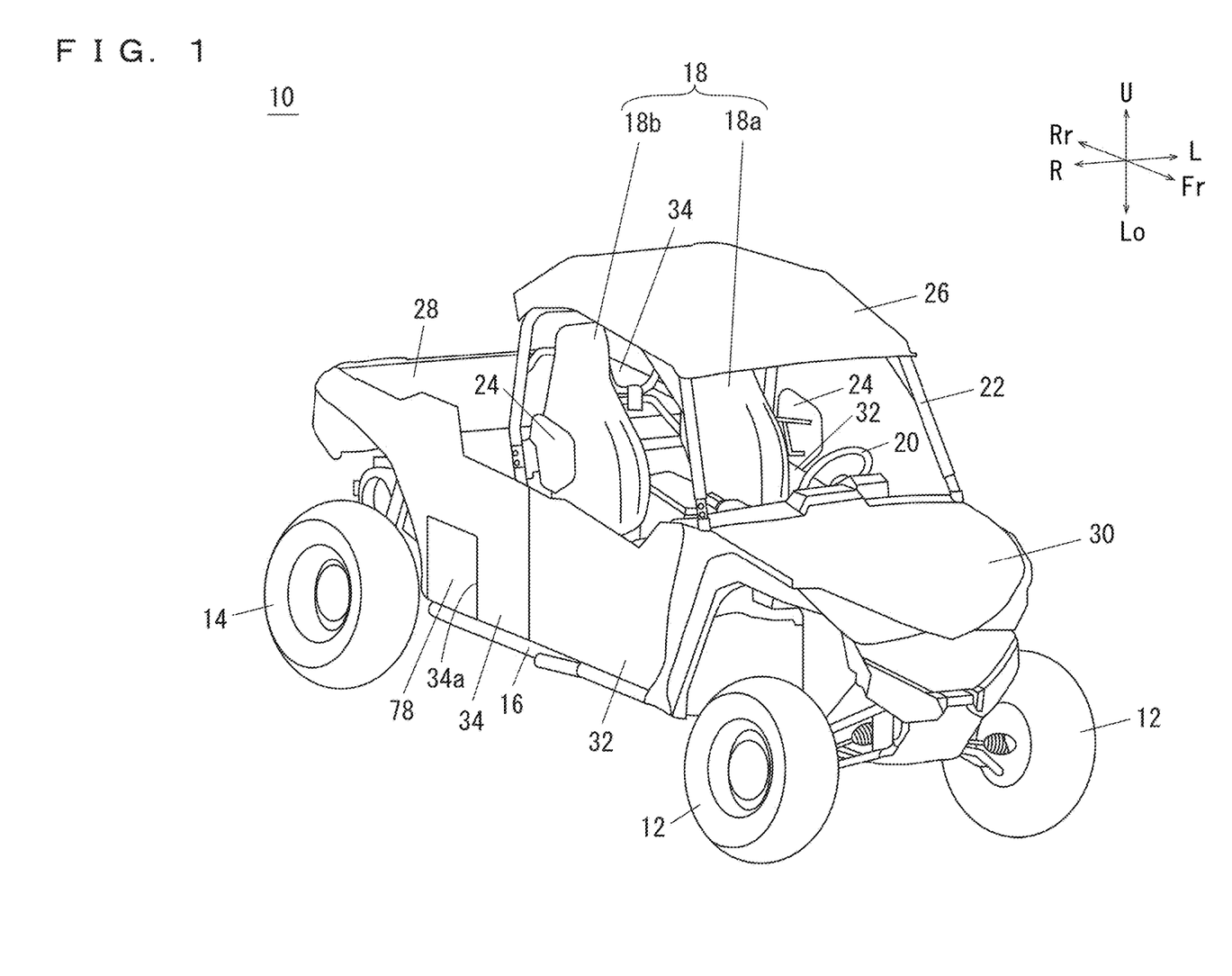
FIG. 1 is a perspective view which schematically shows a vehicle according to a preferred embodiment of the present invention.

Referring to FIG. 1, a vehicle 10 according to a preferred embodiment of the present invention is an ROV vehicle for off-road use, of a type so called midship vehicle. The vehicle 10 includes a pair of front wheels 12, a pair of rear wheels 14, a frame 16, a seat portion 18, the steering wheel 20, a roll-over protection cage 22, shoulder bolster portions 24, a roof 26, a cargo bed 28, a body panel 30, doors 32 and a rear panel 34.

Figure 2:
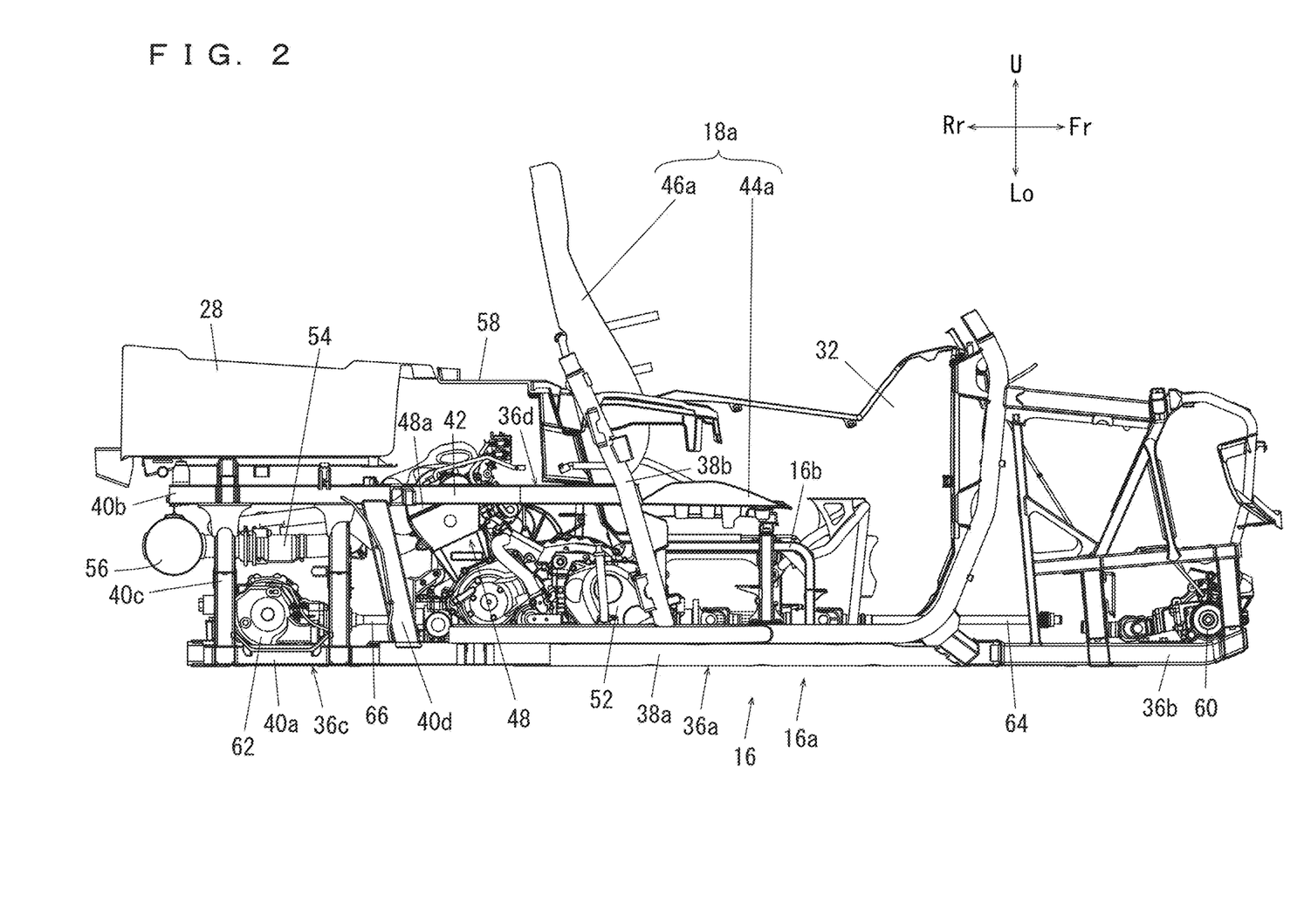
FIG. 2 is a side view which shows a frame, a first seat, an engine, a transmission, a cargo bed, etc.
Figure 3:
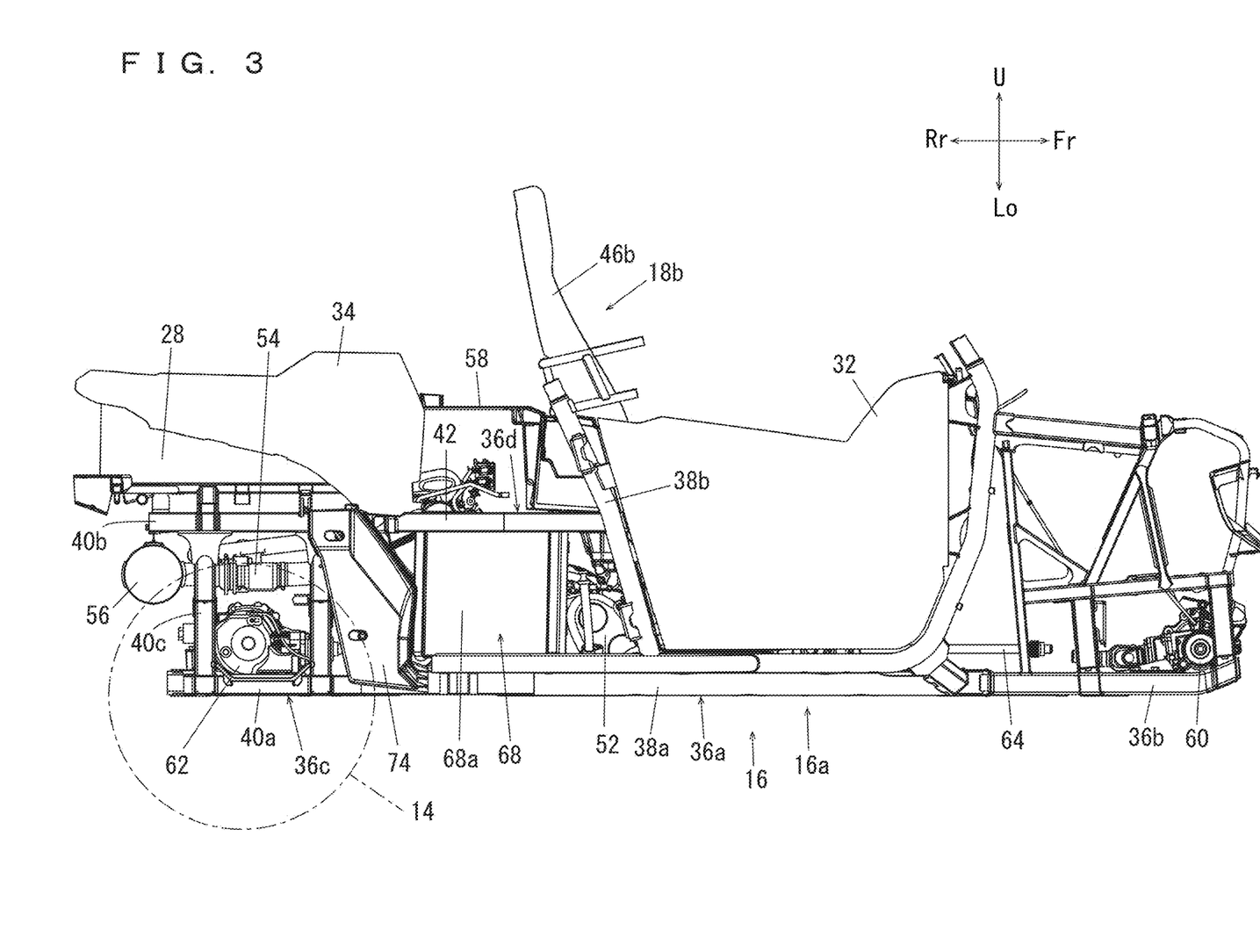
FIG. 3 is a side view which shows the frame, a second seat, a radiator, a shield, the cargo bed, etc.
Figure 4:
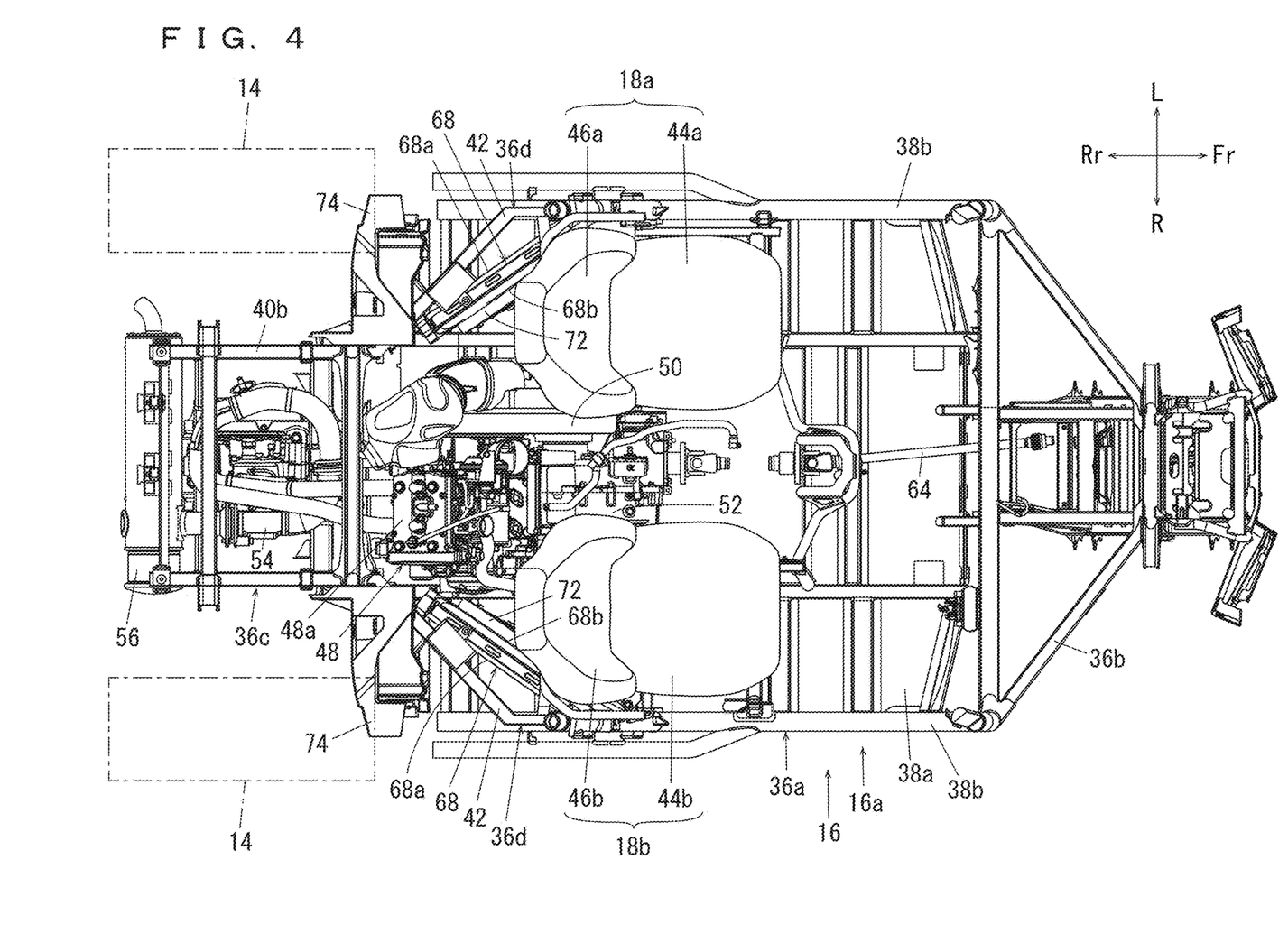
FIG. 4 is a plan view which shows the frame, the first seat, the second seat, the radiator, a rotating fan, the engine, the transmission, etc.

The frame 16 is supported by the pair of front wheels 12 and the pair of rear wheels 14. Referring to FIG. 2 through FIG. 4, the frame 16 includes a main frame portion 16a which is supported by the pair of front wheels 12 and the pair of rear wheels 14, and a seat frame portion 16b which is supported by the main frame portion 16a. The main frame portion 16a includes an intermediate portion 36a, a frame front portion 36b, a rear portion 36c, and a pair of connecting portions 36d.

The intermediate portion 36a includes a substantially rectangular platy portion 38a and a pair of support frame portions 38b. The pair of support frame portions 38b are provided at two end regions, in the vehicle's width direction, of the platy portion 38a.

The frame front portion 36b is ahead of the intermediate portion 36a, and jointed to the intermediate portion 36a.

The rear portion 36c is narrower than the intermediate portion 36a, and is behind the intermediate portion 36a. The rear portion 36c includes: a frame lower portion 40a; a frame upper portion 40b; a connecting portion 40c which connects the frame lower portion 40a and the frame upper portion 40b to each other; and a connecting portion 40d which connects the frame upper portion 40b and the platy portion 38a of the intermediate portion 36a.

Each of the pair of connecting portions 36d preferably has a general V shape, providing a connection between a substantially intermediate region, in an up-down direction, of the support frame portion 38b of the intermediate portion 36a and a front end region of the frame upper portion 40b of the rear portion 36c. The pair of connecting portions 36d each include a slanted portion 42 which extends rearward and diagonally inward, toward the rear portion 36c. In other words, the pair of slanted portions 42 extend diagonally from the intermediate portion 36a side toward the rear portion 36c so that their mutual distance becomes smaller.

Referring to FIG. 1, FIG. 2 and FIG. 4, the seat portion 18 includes the first seat 18a for a driver, and a second seat 18b located next to the first seat 18a for a passenger. The first seat 18a includes a first seating portion 44a and a first backrest portion 46a while the second seat 18b has a second seating portion 44b and a second backrest portion 46b. The first seating portion 44a, the first backrest portion 46a, the second seating portion 44b and the second backrest portion 46b are supported by the seat frame portion 16b. In other words, the first seat 18a and the second seat 18b are supported by the frame 16.

Referring to FIG. 1, the steering wheel 20 is provided ahead of the first seat 18a of the seat portion 18. The roll-over protection cage 22 is provided in a manner to encage the seat portion 18 and the steering wheel 20. The roll-over protection cage 22 is supported by the frame 16.

More specifically, the roll-over protection cage 22 is jointed to upper end regions of the pair of support frame portions 38b.

The pair of support frame portions 38b each include the shoulder bolster portion 24. The roof 26 is provided at an upper portion of the roll-over protection cage 22. The cargo bed 28 is located at a more rearward position than the first seating portion 44a and the second seating portion 44b, and is supported by the frame 16 at a more rearward position than the roll-over protection cage 22, pivotably in an up-down direction. More specifically, the cargo bed 28 is supported by the frame upper portion 40b of the rear portion 36c.

Referring to FIG. 1 through FIG. 3, the body panel 30 is provided on the frame front portion 36b. The door 32 is provided on each side, in the vehicle's width direction, of the seat portion 18. The rear panel 34 is provided behind each door 32. In each rear panel 34, an air-path portion 34a is provided to introduce air to a radiator 68 (which will be described later). In other words, the air-path portion 34a is provided on a side surface of the vehicle 10, on a side of the radiator 68. FIG. 3 shows only a portion of the rear panel 34.

The vehicle 10 further includes a transfer mechanism (not illustrated) which transfers a movement of the steering wheel 20 to the pair of front wheels 12. The transfer mechanism may be provided by any of various known arrangements such as a rack and pinion transfer mechanism, so no more description will be made here.

Referring to FIG. 2 through FIG. 4, the vehicle 10 further includes an engine 48, a CVT (Continuously Variable Transmission) 50 provided on a side (left side in the present preferred embodiment) of the engine 48, and a transmission 52 located ahead of the engine 48. The engine 48 and the transmission 52 are jointed to each other via the CVT 50.

The engine 48 is located more rearward than a front end of the first seat 18a and the second seat 18b and at or substantially at a center of the vehicle in the vehicle width direction. In the present preferred embodiment, in a side view, the engine 48 is between the first/second seating portion 44a/44b and the rear wheels 14. The engine 48 is slightly inclined rearward, below and diagonally ahead of the cargo bed 28, with its crank shaft (not illustrated) directed in the width direction of the vehicle 10. The engine 48 is attached to a rear region of the intermediate portion 38a of the frame 16.

Referring to FIG. 2 and FIG. 4, the engine 48 has a cylinder head 48a, to which an air cleaner (not illustrated) is connected via an air intake tube (not illustrated). Also, a muffler 56 is jointed to the cylinder head 48a via an exhaust pipe 54. The engine 48 is provided with an engine cover 58 thereabove.

Referring to FIG. 2 and FIG. 4, the vehicle 10 further includes a pair of suspension assemblies (not illustrated) which suspend the pair of front wheels 12, a rotation transmission portion 60 which transmits rotation outputted from the engine 48 to the pair of front wheels 12, a pair of suspension assemblies (not illustrated) which suspend the pair of rear wheels 14, a rotation transmission portion 62 which transmits rotation outputted from the engine 48 to the pair of rear wheels 14, and propeller shafts 64, 66.

The propeller shaft 64 is provided to extend forward from a lower end portion of the engine 48 while the propeller shaft 66 is provided to extend rearward from a lower end portion of the engine 48, at a substantially intermediate region in the width direction of the vehicle 10.

The frame 16 is supported by the pair of front wheels 12 and the pair of rear wheels 14 via the suspension assemblies.

The rotation transmission portion 60 is connected with the engine 48 via the propeller shaft 64, the transmission 52 and the CVT 50. The rotation transmission portion 62 is connected with the engine 48 via the propeller shaft 66, the transmission 52 and the CVT 50. Therefore, rotation of the engine 48 undergoes speed changes performed by the CVT 50 and the transmission 52, and then is transmitted to the pair of front wheels 12 via the propeller shaft 64 and the rotation transmission portion 60. This rotates the pair of front wheels 12. Also, rotation of the engine 48 undergoes speed changes performed by the CVT 50 and the transmission 52, and then is transmitted to the pair of rear wheels 14 via the propeller shaft 66 and the rotation transmission portion 62. This rotates the pair of rear wheels 14.

Referring to FIG. 2 through FIG. 4, a radiator 68 is provided on each of a left and a right sides in the frame 16. Each radiator 68 includes an outer surface 68a facing rearward and outward of the vehicle, and located more rearward than the first seating portion 44a and the second seating portion 44b and lower than a lower surface of the cargo bed 28. Also, each radiator 68 is placed at a position which is more outward, in the vehicle's width direction, than the engine 48 and more forward than the rear wheels 14, overlapping the engine 48 and the transmission 52 in a side view. Each radiator 68 is supported by the connecting portion 36d. More specifically, referring to FIG. 5, each radiator 68 has its upper edge portion provided with two generally L-shaped elastic brackets 70a, 70b attached thereto while each radiator 68 has its lower edge portion provided with a generally strip-shaped elastic bracket 70c. With the above arrangement, each radiator 68 is supported at an inner surface of the connecting portion 36d via the brackets 70a, 70b, and is provided on the platy portion 38a of the intermediate portion 36a via the bracket 70c. Thus, each radiator 68 is disposed on an inner side of the slanted portion 42, oriented generally along the direction in which the slanted portion 42 extends, and is supported by the slanted portion 42. In the present preferred embodiment, the radiator 68 is disposed so that its outer surface 68a faces rearward-and-sideward (i.e., diagonally rearward and sideward) of the vehicle. In other words, the outer surface 68a of the radiator 68 is orthogonal to a line of direction extending rear-and-sideward (i.e., diagonally rearward and sideward) of the vehicle. Also, in a side view, each radiator 68 is located between the slanted portion 42 and the platy portion 38a.

Figure 5:
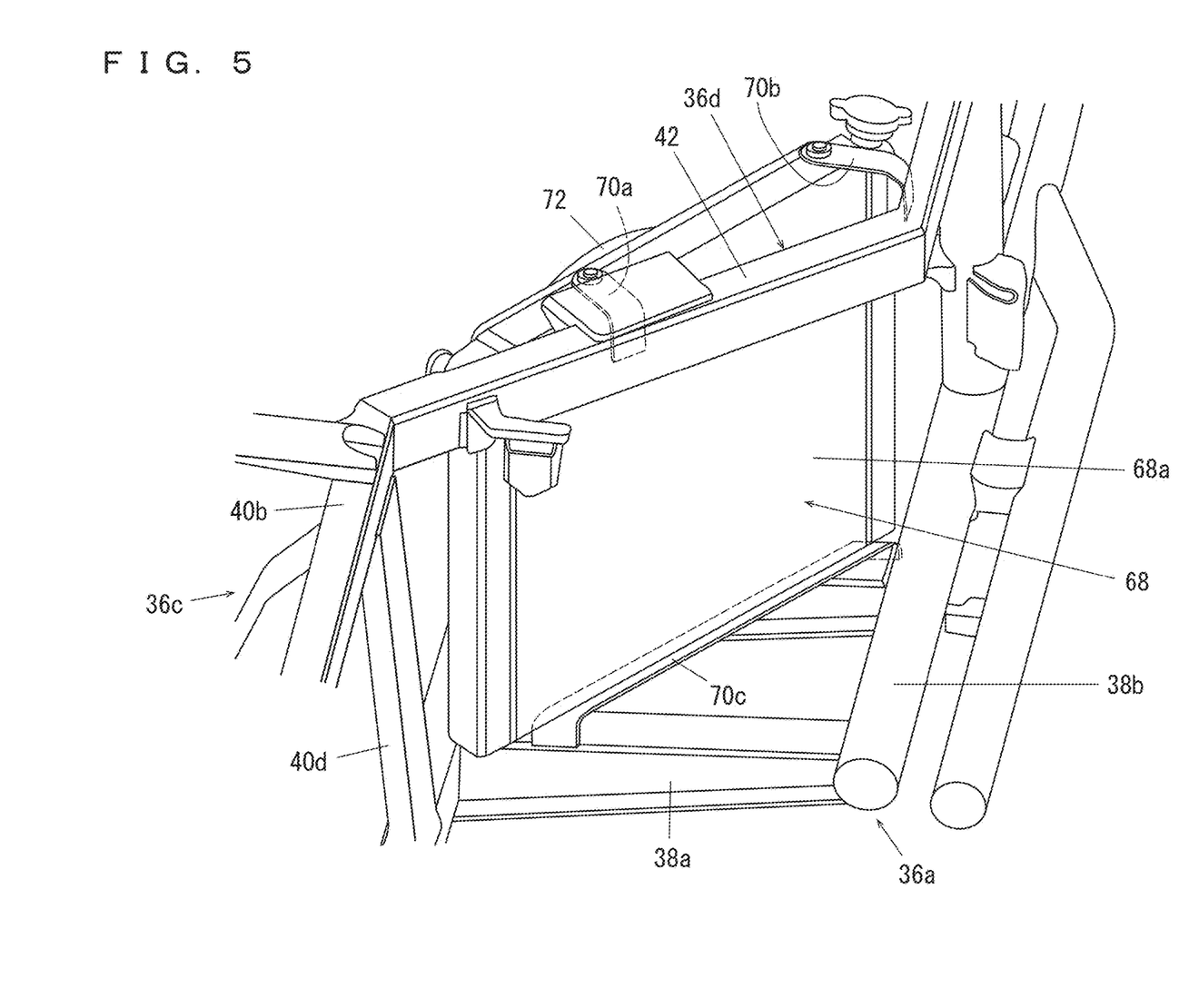
FIG. 5 is a perspective view which shows a slanted portion, the radiator and surrounds thereof.
Figure 6:
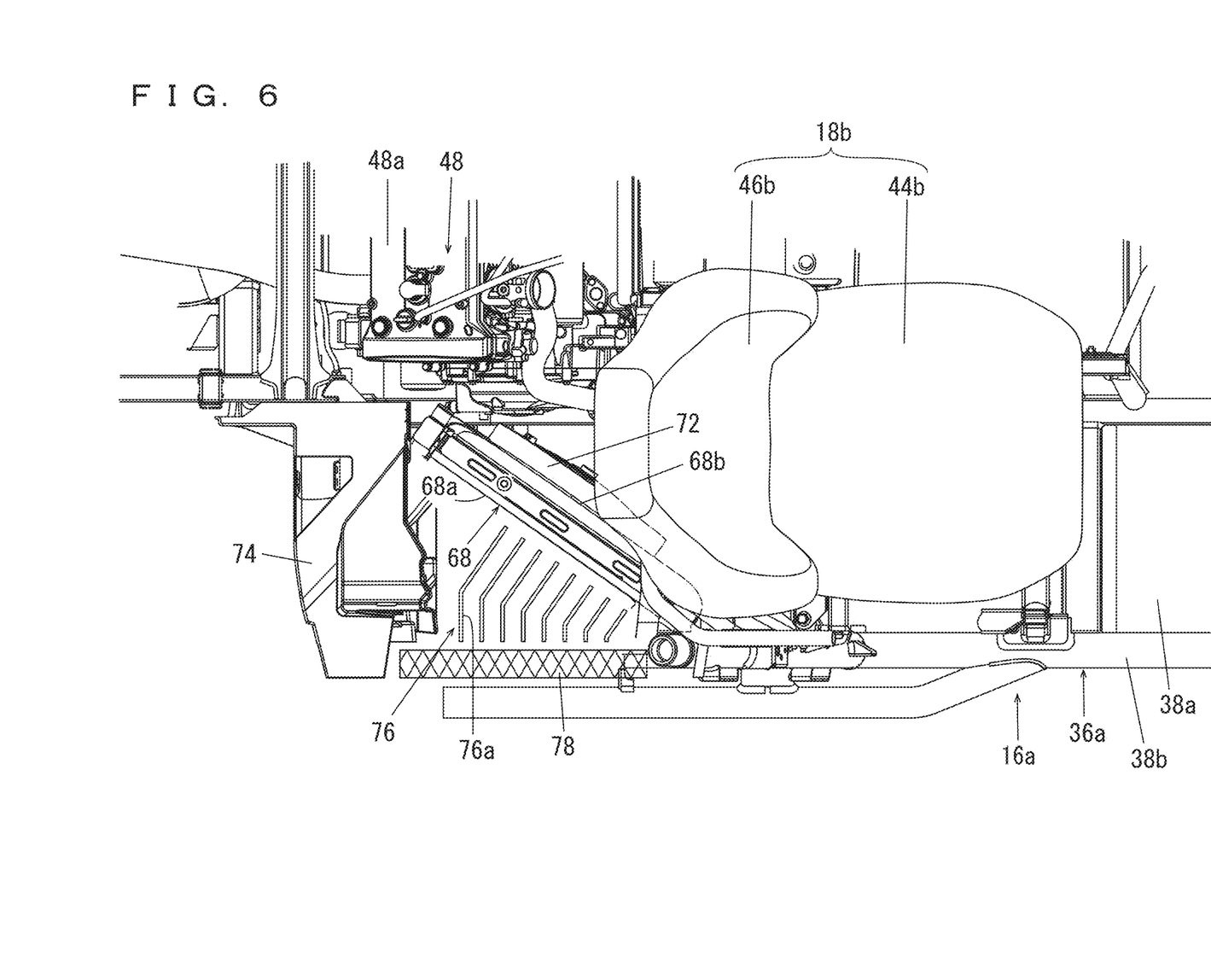
FIG. 6 is a plan view which shows the radiator, the rotating fan, a louver, a mesh, etc.

Referring to FIG. 4 through FIG. 6, a rotating fan 72 is provided on a side of an inner surface 68b of the radiator 68. By operating the rotating fan 72, it is possible to introduce air from outside the vehicle to inside the vehicle via the outer surface 68a and the inner surface 68b of the radiator 68.

Referring to FIG. 3, FIG. 4 and FIG. 6, each shield 74 is provided between the rear wheel 14 and the radiator 68. An outer end of the radiator 68 is located more inward in the vehicle width direction than an outer end of the shield 74.

Referring to FIG. 6, on an outward side, in the vehicle's width direction, of the radiator 68, a louver 76 is provided as an air intake to introduce air to the radiator 68. In other words, the louver 76 is provided in an air introduction path to the radiator 68. The louver 76 is provided in such a fashion that its slats 76a is orthogonal or substantially orthogonal to the outer surface 68a of the radiator 68. Also, on an outward side, in the vehicle's width direction, of the slats 76a, a mesh 78 is provided in the air-path portion 34a of the rear panel 34 (see FIG. 1).

According to the vehicle 10 as described thus far, since the radiator 68 is provided at a position which is more rearward than the first seating portion 44a and the second seating portion 44b, and lower than the lower surface of the cargo bed 28; and the radiator 68 has its outer surface 68a faced rearward and outward of the vehicle, it is possible, without providing a radiator cover, to prevent flying objects flying from ahead of the vehicle from directly hitting the outer surface 68a of the radiator 68, and decrease damage caused to the radiator 68 by the flying objects flying from ahead of the vehicle. In this arrangement, an area which is on the inner surface 68b (back surface) side of the radiator 68, i.e., an area which is on the engine 48 side and is surrounded by the seat portion 18, the cargo bed 28 and the engine cover 58, is not likely for flying objects to enter. Also, by operating the rotating fan 72, it is possible to forcibly introduce outside air from an outward of the vehicle, through the radiator 68, and in an inward direction of the vehicle. Therefore, it is possible to bring outside air to the radiator 68 without providing any members for introducing outside air from ahead of the vehicle. Therefore, it is possible to prevent flying objects from coming ahead of the vehicle to the outer surface 68a of the radiator 68, and to maintain cooling efficiency of radiator 68, effectively. Preferred embodiments of the present invention are particularly effective in off-road vehicles such as ROVs designed primarily for traveling on rough terrain.

Since it is possible to use the rotating fan 72 to introduce outside air which has passed through the radiator 68 inwardly of the vehicle, and to introduce the outside air also to a rearward portion of the first seat 18a and the second seat 18b, it is possible to improve ability to cool the engine 48 and surrounds thereof. Preferred embodiments of the present invention are particularly effective in midship vehicles.

In a side view, the radiator 68 overlaps the engine 48 and the transmission 52. Therefore, it is possible to place the radiator 68 closely to the engine 48 and/or the transmission 52, supply effectively the outside air which was introduced by the rotating fan 72 to surroundings of the engine 48 and the transmission 52, and therefore to increase air fluidity and the temperature rise of the engine 48 and the transmission 52 can be reduced. Also, it becomes possible to shorten a pipe between the radiator 68 and the engine 48, making it possible to reduce cost.

The slanted portion 42 extends rearward and diagonally inward, toward the rear portion 36c. By placing the radiator 68 substantially along the direction in which the slanted portion 42 extends, and supporting with the slanted portion 42, it becomes possible to dispose the radiator 68 easily, without allowing it to protrude outward beyond the slanted portion 42 while the outer surface 68a of the radiator 68 faces rearward and outward of the vehicle. Also, the arrangement which makes the slanted portion 42 support the radiator 68 requires no additional support structures.

It is possible, with the shield 74 which defines and functions as a mudguard, to decrease damage caused to the radiator 68 by flying objects from the rear wheels 14.

Since the outer end of the radiator 68 is located more inward in the width direction of the vehicle than an outer end of the shield 74, it is possible to further decrease damage caused to the radiator 68 by flying objects from the rear wheels 14.

Since the rotating fan 72 is disposed on the inner surface 68b side of the radiator 68, it is possible, with the radiator 68, to protect the rotating fan 72 from flying objects from outward.

By providing a plurality of radiators 68, it becomes possible to improve cooling ability, and also to decrease the size of each radiator 68.

With the louver 76 which defines and functions as an air intake to introduce air to the radiator 68, it is possible to improve rectification effect to the radiator 68. Also, with the louver 76 and the mesh 78, it is possible to guard the radiator 68 from flying objects from the rear wheels 14 and surrounds, and decrease entry of dust into the radiator 68.

By having the radiator 68 disposed at a rear portion of the vehicle, it becomes possible to increase design freedom of the front portion of the vehicle.

By disposing the radiator 68 in a diagonal fashion, the radiator 68 requires a shorter length in the fore-aft direction, and therefore it becomes possible to shorten the wheelbase and make the vehicle 10 compact.

It should be noted here that the rotating fan 72 may be provided on the outer surface 68a side of the radiator 68. In this case, it is possible, with the radiator 68, to protect the rotating fan 72 from heat generated by the engine 48 for example.

In a side view, the radiator 68 should overlap at least one of the engine 48 and the transmission 52.

The radiator 68 should be provided on at least one of the left and right sides in the frame 16. If only one radiator 68 is installed, it becomes possible to shorten the pipe length, and to decrease cost.

In the preferred embodiments described above, the radiator 68 is disposed so that its outer surface 68a faces rearward-and-sideward (i.e., diagonally sideward and rearward) of the vehicle. However, preferred embodiments of the present invention are not limited to this. The radiator should have its outer surface facing rearward and also in any outward direction of the vehicle, such as rearward-and-upward of the vehicle, and rearward-and-downward of the vehicle. In other words, the radiator may be disposed in any fashion as far as its outer surface is faced in any diagonally rearward direction, i.e., not only in diagonally sideward and rearward direction, but also in diagonally upward and rearward direction, diagonally downward and rearward direction, etc.

Preferred embodiments of the present invention are not limited to vehicles powered by engines, but applicable also to vehicles powered by motors.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle comprising:
   a front wheel;
   a rear wheel;
   a frame supported by the front wheel and the rear wheel;
   a first seat for a driver that is supported by the frame and includes a first seating portion;
   a second seat supported by the frame and located next to the first seat and including a second seating portion;
   a cargo bed located more rearward than the first seating portion and the second seating portion;
   a radiator including an outer surface facing rearward and outward of the vehicle, and located more rearward than the first seating portion and the second seating portion and lower than a lower surface of the cargo bed; and
   a rotating fan to introduce air from outside the vehicle toward an inside of the vehicle via the outer surface of the radiator.

2. The vehicle according to claim 1, further comprising:
an engine located rearward than a front end of the first seat and the second seat and at or substantially at a center of the vehicle in a vehicle width direction; wherein
the radiator is located more outward in the vehicle width direction than the engine.

3. The vehicle according to claim 2, further comprising:
a transmission connected to the engine; wherein
the radiator overlaps the engine or the transmission in a side view of the vehicle.

4. The vehicle according to claim 1, wherein
the frame includes an intermediate portion, a rear portion narrower than the intermediate portion and located behind the intermediate portion, and a connecting portion connecting the intermediate portion and the rear portion with each other;
the connecting portion includes a slanted portion extending rearward and diagonally inward toward the rear portion; and
the radiator is supported by the slanted portion.

5. The vehicle according to claim 1, wherein
the radiator is located more forward than the rear wheel; and
the vehicle further comprises a shield located between the radiator and the rear wheel.

6. The vehicle according to claim 5, wherein an outer end of the radiator is located more inward in the vehicle width direction than an outer end of the shield.

7. The vehicle according to claim 1, wherein the rotating fan is located on either an outer surface side and an inner surface side of the radiator.

8. The vehicle according to claim 1, wherein the radiator includes a first radiator and a second radiator located, respectively, on a left side and a right side of the frame.

9. The vehicle according to claim 1, further comprising an air intake to introduce air to the radiator.

10. The vehicle according to claim 1, wherein the rotating fan introduces the air from the outside of the vehicle toward a center of the vehicle in a vehicle width direction.

11. The vehicle according to claim 1, wherein the rotating fan introduces the air from the outside of the vehicle to the inside of the vehicle in a vehicle width direction.

* * * * *